United States Patent
Jung et al.

(10) Patent No.: US 8,761,203 B2
(45) Date of Patent: Jun. 24, 2014

(54) METHOD FOR DETERMINING PACKET TYPE FOR SVC VIDEO BITSTREAM, AND RTP PACKETIZING APPARATUS AND METHOD USING THE SAME

(75) Inventors: Soon-Heung Jung, Daejon (KR); Kwang-Deok Seo, Gangwon-do (KR); Jae-Gon Kim, Daejon (KR); Jin-Woo Hong, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 686 days.

(21) Appl. No.: 12/513,542

(22) PCT Filed: Sep. 12, 2007

(86) PCT No.: PCT/KR2007/004413
§ 371 (c)(1),
(2), (4) Date: May 5, 2009

(87) PCT Pub. No.: WO2008/056878
PCT Pub. Date: May 15, 2008

(65) Prior Publication Data
US 2010/0067522 A1 Mar. 18, 2010

(30) Foreign Application Priority Data
Nov. 9, 2006 (KR) .................. 10-2006-0110714
Dec. 8, 2006 (KR) .................. 10-2006-0125144

(51) Int. Cl.
*H04J 3/24* (2006.01)
*H04N 7/12* (2006.01)

(52) U.S. Cl.
USPC ............................. 370/474; 375/240.01

(58) Field of Classification Search
None
See application file for complete search history.

(56) References Cited

U.S. PATENT DOCUMENTS 7,725,593 B2 * 5/2010 Visharam et al. ............. 709/231
8,060,651 B2 * 11/2011 Deshpande et al. .......... 709/246
(Continued)

FOREIGN PATENT DOCUMENTS

| EP | 1 311 125 A2 | 5/2003 |
| EP | 1 631 088 A1 | 3/2006 |
| KR | 1020060017973 A | 2/2006 |
| WO | 2004/036916 A1 | 4/2004 |

OTHER PUBLICATIONS

Wenger et al., "RTP Payload Format for SVC Video", Jun. 2006, "draft-wenger-avt-rtp-svc-02.txt".*

(Continued)

*Primary Examiner* — Chirag Shah
*Assistant Examiner* — Jenkey Van
(74) *Attorney, Agent, or Firm* — Ladas & Parry LLP

(57) ABSTRACT

Provided are a method for determining the packet type for a Scalable Video Coded (SVC) video bitstream, and a Real-time Transport Protocol (RTP) packetizing apparatus and method using the same. The method for determining a packet type for a Scalable Video Coded (SVC) video bitstream, which includes the steps of: a) deriving temporal and spatial hierarchy information between Network Abstraction Layer (NAL) units from field information defined in the NAL unit headers of scalable layers; b) detecting the type of encoding information by applying combined scalability encoding to the hierarchical structure of the Scalable Video Coding (SVC); and c) determining a Real-time Transport Protocol (RTP) packet type for the corresponding SVC video bitstream by using the derived temporal and spatial hierarchy information between the NAL units and the detected type of encoding information.

10 Claims, 8 Drawing Sheets

(56) References Cited

U.S. PATENT DOCUMENTS

2004/0223551 A1* 11/2004 Hannuksela ............. 375/240.25
2007/0086521 A1* 4/2007 Wang et al. ................ 375/240.1
2009/0041130 A1* 2/2009 Yoon et al. ............... 375/240.26

OTHER PUBLICATIONS

Wenger et al., "RFC 3984: RTP Payload format for H.264 Video", Feb. 2006.*

Thomas Wiegand; "H.264 Draft ISO/IEC 14496-10" (ISO/IEC JTC1/SC29/WG11 and ITU-T SG16 Q.6, Geneva, Switzerland, May 23-27, 2003).

International Search Report; mailed Dec. 6, 2007; PCT/KR2007/004413.

Kwang-Deok Seo, et al; "RTP Non-Interleaved Mode Packetization for SVC Transmission", 2006 Autumn Conference Journal of Korea Multimedia Society, pp. 187-190, Nov. 25, 2006.

* cited by examiner

FIG. 1

(PRIOR ART)

| NAL Unit Type | Packet Type | single NAL Unit Mode | Non-interleaved Mode | Interleaved Mode |
|---|---|---|---|---|
| 0 | undefined | ignore | ignore | ignore |
| 1~23 | single NAL unit | yes | yes | no |
| 24 | STAP-A | no | yes | no |
| 25 | STAP-B | no | no | yes |
| 26 | MTAP16 | no | no | yes |
| 27 | MTAP24 | no | no | yes |
| 28 | FU-A | no | yes | yes |
| 29 | FU-B | no | no | yes |
| 30~31 | undefined | ignore | ignore | ignore |

FIG. 2
(PRIOR ART)

| nal_unit_type | Content of NAL unit and RBSP syntax structure |
|---|---|
| 0 | Unspecified |
| 1 | Coded slice of a non-IDR picture |
| 2 | Coded slice data partition A |
| 3 | Coded slice data partition B |
| 4 | Coded slice data partition C |
| 5 | Coded slice of an IDR picture |
| 6 | Supplemental enhancement information (SEI) |
| 7 | Sequence parameter set |
| 8 | Picture parameter set |
| 9 | Access unit delimiter |
| 10 | End of sequence |
| 11 | End of stream |
| 12 | Filler data |
| 13 | Sequence parameter set extension |
| 14..18 | Reserved |
| 19 | Coded slice of an auxiliary coded picture without partitioning |
| 20 | Coded slice of a non-IDR picture in scalable extension |
| 21 | Coded slice of an IDR picture in scalable extension |
| 22..23 | Reserved |
| 24..31 | Unspecified |

METHOD FOR DETERMINING PACKET TYPE FOR SVC VIDEO BITSTREAM, AND RTP PACKETIZING APPARATUS AND METHOD USING THE SAME

CROSS-REFERENCE TO RELATED APPLICATIONS

The present application claims priority to Korean Patent Application No. 10-2006-0125144, filed on Dec. 8, 2006, and Korean Patent Application No. 10-2006-0110714, filed on Nov. 9, 2006.

TECHNICAL FIELD

The present invention relates to a method for determining the packet type for a Scalable Video Coded (SVC) video bitstream, and a Real-time Transport Protocol (RTP) packetizing apparatus and method using the same; and, more particularly, to a method for determining the packet type for RTP packetization in a procedure of applying RTP packetization to an SVC bitstream, and an RTP packetizing method and apparatus including an RTP packet generating method based on the packet type determining method.

BACKGROUND ART

Scalable Video Coding (SVC), which is a scalable coding technique of H.264, is a new scalable coding technique that is developed to solve the problems of low compression efficiency, unsupportability of combined scalability, and high implementation complexity, which are caused by layered coding-based scalability attempted in existing Moving Picture Experts Group 2 (MPEG-2), MPEG-4, etc.

SVC encodes multiple video layers into a single bit sequence. The layers of SVC include one base layer and scalable layers that can be continuously stacked over the base layer.

Each scalable layer is able to express the maximum bit rate, frame rate and resolution that are given to itself based on low-order layer information.

The more the SVC continuously stacks scalable layers, the more diverse bit rates, frame rates, and resolutions it is possible to support. Thus, the SVC is a coding technique suitable for multimedia contents service in a Universal Multimedia Access (UMA) environment that can solve the problem of variability in bandwidth that occurs in a heterogeneous network environment, the problem of variability in receiving terminal performance and resolution, the problem of various preferences of contents consumers and so on in a complex way.

A Video Coding Layer (VCL) of an SVC encoder generates base layer encoding information and scalability encoding information of the scalable layers in slices.

Each slice is generated in Network Abstraction Layer (NAL) units in an NAL and stored in an SVC bitstream.

Although an RTP payload format for loading the NAL units of the SVC is currently disclosed in an internet draft document "draft-wenger-avt-rtp-svc-02.txt", the SVC is of a complicated structure that stores encoding information of SNR scalability and temporal and spatial scalability, as well as base layer encoding information that is compatible with H.264, in a single bit stream. Thus, no research has provided a result yet on an effective RTP packetizing method that can support the RTP payload format of the SVC.

As RTP packet types for the NAL units of the SVC, there are a total of seven types, including a Single NAL Unit (SNU), a Single-Time Aggregation Packet-A (STAP-A), STAP-B, Multi-Time Aggregation Packet 16 (MTAP16), MTAP24, Fragmentation Unit-A (FU-A), and FU-B.

The SNU type can load only one NAL unit in one RTP, and the STAP can simultaneously load multiple NAL units that belong to the same presentation time instant in one RTP packet. This STAP is divided into an STAP-A type that loads NAL units in an RTP packet in the same order as decoding and a STAP-B type that loads NAL units in an RTP packet without considering the encoding order for interleaving purposes.

The MTAP can load multiple NAL units belonging to different presentation time instants in one RTP packet at a time and basically supports interleaving. This MTAP is divided into an MTAP16 type supporting a 16-bit time offset and an MTAP24 type supporting a 24-bit time offset depending on the size of a time offset field for displaying the difference in presentation time instant between the NAL units.

Among these seven RTP packet types, only packet types required according to an application field are aggregated by three types of RTP packet modes. FIG. 1 shows RTP packet types that can be supported by three types of RTP packet modes including an SNU mode, a non-interleaved mode, and interleaved mode.

The SNU mode of FIG. 1 is able to support only the SNU type that can load only one NAL unit having 1 to 23 "NAL_unit_types" shown in FIG. 2 in an RTP packet, and its application field is restrictive.

On the other hand, the non-interleaved mode is able to support the STAP-A and the FU-A as well as the SNU type, and thus, its practically applicable application range is wide.

The interleaved mode is a mode that adds an interleaving function to the non-interleaved mode, and has a drawback that it cannot support the SNU type. As the order of the NAL units to be loaded in the RTP packet by the interleaving function of the interleaved mode is different from the order of decoding, a burst error in a channel can be effectively dealt with, but RTP packetization and de-packetization and an SVC decoding procedure become very complicated.

Therefore, in view of the implementation complexity and the applicable application range, the non-interleaved mode is suitable as the RTP packetization mode that must be necessarily supported in a commercial SVC streaming service, and the interleaved mode can be considered as an option for a service in an environment with high channel error.

The SNU type of the non-interleaved mode is supposed to load one NAL unit having 1 to 23 "NAL_unit_types" shown in FIG. 2 in one RTP packet.

In other words, the STAP-A type of the non-interleaved mode has an RTP payload format structure as shown in FIG. 3, and is of the type that aggregates several NAL units corresponding to the same presentation time instant and loads the same in one RTP packet.

The STAP-A type of the non-interleaved mode, as shown in FIG. 3, has a 1-byte RTP payload header (STAP-A NAL HDR) additionally inserted therein, unlike the SNU type. The value of the F field of the payload header is set to "1" if there is more than one NAL unit in which the F field indicated in each of the headers of the NAL units to be loaded together has a value of "1"

The NRI field of the payload header is set to the maximum value of the NRI field values indicated in each of the headers of the NAL units to be loaded together.

In the "Type" field of the payload header, "NAL_unit_type" of No. 24 in FIG. 3 is set in order to show that this is a STAP-A type.

In addition, the "NALU_Size" field of 2 bytes representing the size of each NAL unit to be loaded separately from payload header information is inserted in the front part of each NAL unit.

The FU-A type of the non-interleaved mode is a type that divides a NAL unit into two or more so that it does not exceed an MTU (Maximum Transmission Unit) size and loads the divided units in respective corresponding RTP packets in order to prevent the occurrence of packet fragmentation in a router or gateway during transmission if the size of one NAL unit exceeds that of the MTU of a network.

FIG. 4 illustrates the structure of an RTP payload format for the FU-A type. The RTP payload header is composed of a total of 2 bytes including one byte of "FU_indicator" and one byte of "FU_header".

The values indicated in the headers of the NAL units are applied to the F field and NRI field of "FU_indicator" as it is.

"NAL_unit_type" of "No. 28" in FIG. 1 is set in the "Type" field of "FU_indicator" in order to show that this is the FU-A type.

The S field and E field of "FU_header" are used in order to show that the parts to be divided and loaded are the start part of an NAL unit or the end part thereof, respectively.

In the "Type" field of the "FU_header", the "NAL_unit_type" value indicating encoding contents contained in the NAL unit is set, as shown in FIG. 2.

That is, as described above, although the RTP packet type for the NAL units stored in an SVC bitstream is classified as standard, there has been no suggestion of the standard and method for determining a given NAL unit as a suitable packet type.

Consequently, the present invention proposes a practical RTP packetization algorithm which can effectively load NAL units of an SVC in an RTP payload while maintaining the specification of the RTP payload format.

DISCLOSURE OF INVENTION

Technical Problem

It is, therefore, an object of the present invention to provide a method for determining a packet type for RTP packetization in a procedure of applying RTP packetization to an SVC bitstream, and an RTP packetizing method and apparatus including an RTP packet generating method based on the packet type determining method.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a method for determining a packet type for a Scalable Video Coded (SVC) video bitstream, which includes the steps of: a) deriving temporal and spatial hierarchy information between Network Abstraction Layer (NAL) units from field information defined in the NAL unit headers of scalable layers; b) detecting the type of encoding information by applying combined scalability encoding to the hierarchical structure of the SVC; and c) determining a Real-time Transport Protocol (RTP) packet type for the corresponding SVC video bitstream by using the derived temporal and spatial hierarchy information between the NAL units and the detected type of encoding information.

The temporal and spatial hierarchy information derivation step of a) is performed by a combination of related hierarchy values (TL, DID, and QL) between the layers in the temporal and spatial SNR scalability defined in the last octet of the scalable layer NAL unit headers.

The encoding information type detection step of b) is carried out by analyzing "NAL_unit_type" values of the NAL units belonging to the base layer and the scalable layers, which are the "NAL_unit_type" values indicating encoding information. The packet type determined in the step c) is any one among Single NAL Unit (SNU), Fragmentation Unit-A (FU-A), and Single-Time Aggregation Packet-A (STAP-A) types of a non-interleaved mode.

In accordance with another aspect of the present invention, there is provided a packetizing method for an SVC video bitstream, which includes the steps of: a) determining a packet type for the SVC video bitstream; and b) fragmenting the SVC video bitstream so as to conform the SVC video bitstream to the determined packet type and loading the fragments in RTP packets.

In accordance with another aspect of the present invention, there is provided an apparatus for packetizing an SVC video bitstream, which includes: a packet type determiner for determining a packet type for the SVC video bitstream; and a packet generator for generating a packet by fragmenting the SVC video bitstream so as to conform the SVC video bitstream to the packet type determined by the packet type determiner and loading the fragments in RTP packets.

Advantageous Effects

As mentioned above and will be described below, the present invention can efficiently determine the packet type for an SVC bitstream and perform RTP packetization using the same.

As a result, the present invention can more efficiently transmit an SVC video bitstream through an IP network such as the internet.

BRIEF DESCRIPTION OF THE DRAWINGS

FIG. 1 is a table showing a packet type supportable for each RTP packetization mode.

FIG. 2 is a table summarizing contents contained in NAL units by NAL_unit_types.

BEST MODE FOR CARRYING OUT THE INVENTION

The advantages, features and aspects of the invention will become apparent from the following description of the embodiments with reference to the accompanying drawings, which is set forth hereinafter. Thus, the present invention will be easily practiced by those skilled in the art. Further, in the following description, well-known arts will not be described in detail if it seems that they could obscure the invention in unnecessary detail. Hereinafter, specific embodiments of the present invention will be set forth in detail with reference to the accompanying drawings.

Figure 3:
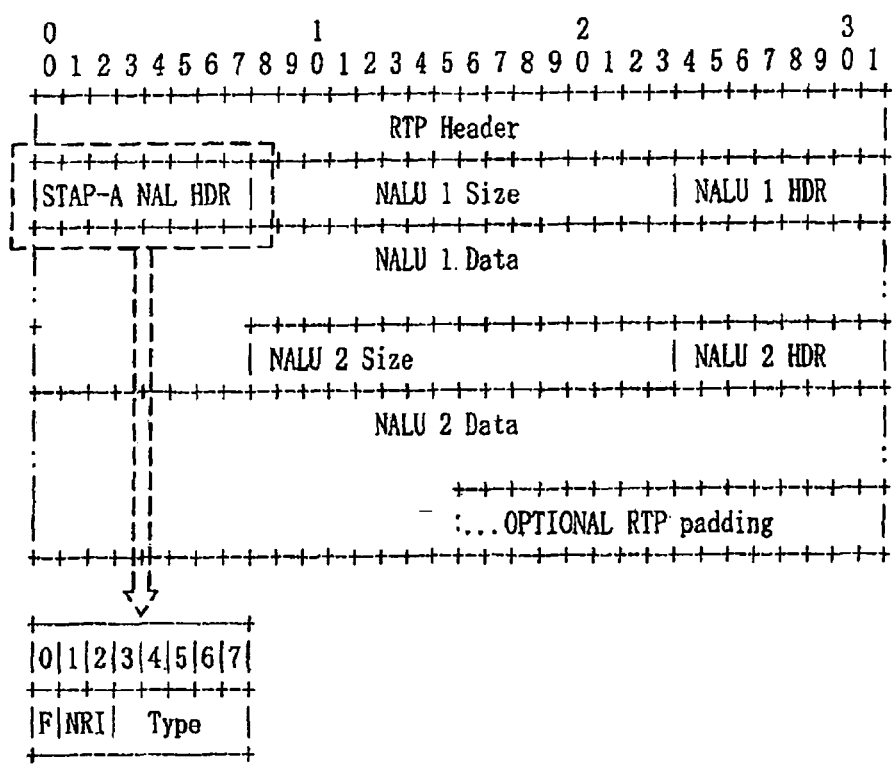
FIG. 3 is an explanatory view showing an RTP payload format structure for a STAP-A type.
Figure 4:
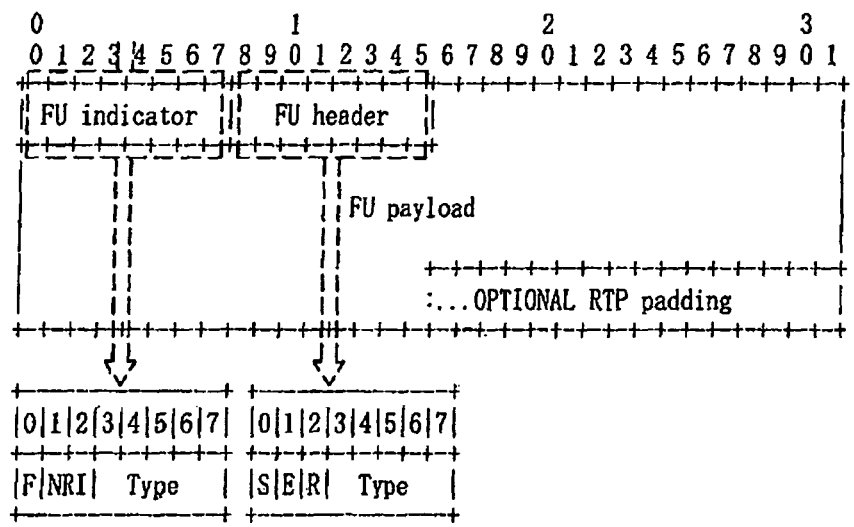
FIG. 4 is an explanatory view showing an RTP payload format structure for an FU-A type.
Figure 5:
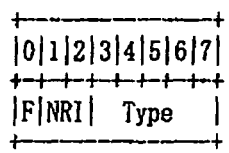
FIGS. 5 and 6 are explanatory views showing the header structures of NAL units used in a base layer and scalable layers of an SVC in accordance with the present invention.
Figure 6:
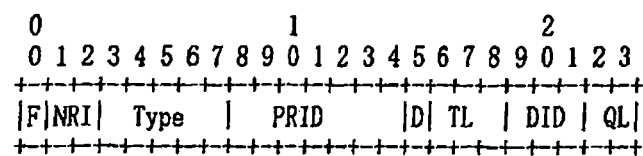

FIGS. 5 and 6 are explanatory views showing header structures of NAL units used in the base layer and scalable layers of an SVC in accordance with the present invention.

Encoding information generated by SVC encoding is stored in a bit stream in NAL units. As shown in FIGS. 5 and 6, the header structure of the NAL unit generated in the base layer and that of the NAL unit generated in the scalable layers are different from each other.

FIG. 5 shows the header structure of the NAL unit generated in the base layer compatible with H.264, and FIG. 6 depicts the header structure of the NAL unit generated in the scalable layers.

In FIGS. 5 and 6, the "Type" field means "NAL_unit_type" representing information on contents of encoding information contained in the NAL unit, and shows the type of encoding information contained in the NAL unit for each of the aforementioned "NAL_unit_types" of FIG. 2.

The "NAL_unit_types" of Nos. 1 to 6 are usable in the NAL unit of the base layer is, while the "NAL_unit_types" of Nos. 20 and 21 are usable in the scalable layers. The other "NAL_unit_types" are used to indicate the NAL units containing not encoding information but additional information.

In the present invention, temporal and spatial hierarchy for each of the NAL units can be derived from (TL, DID, and QL) field information defined in the header of each NAL unit of the scalable layers.

The (TL, DID, QL) field, which is the last octet, in FIG. 6 represents the inter-layer hierarchy in the temporal and spatial SNR scalability. That is, TL (temporal_level) represents the hierarchy between temporal layers for temporal scalability, DID (dependency_id) indicates the dependency hierarchy between higher/lower scalable layers in the inter-layer prediction of spatial scalability, and QL (quality_level) represents the hierarchy between FGS layers for support of SNR scalability.

The TL, DID, and QL values are all integers greater than "0", and the temporal and spatial hierarchy of the NAL units can be derived from a combination of these values.

Based on the (TL, DID, QL) information and the "NAL_unit_types" thus analyzed, a practical RTP packetization algorithm that can be effectively applied to combined scalability of the SVC is proposed.

Figure 7:
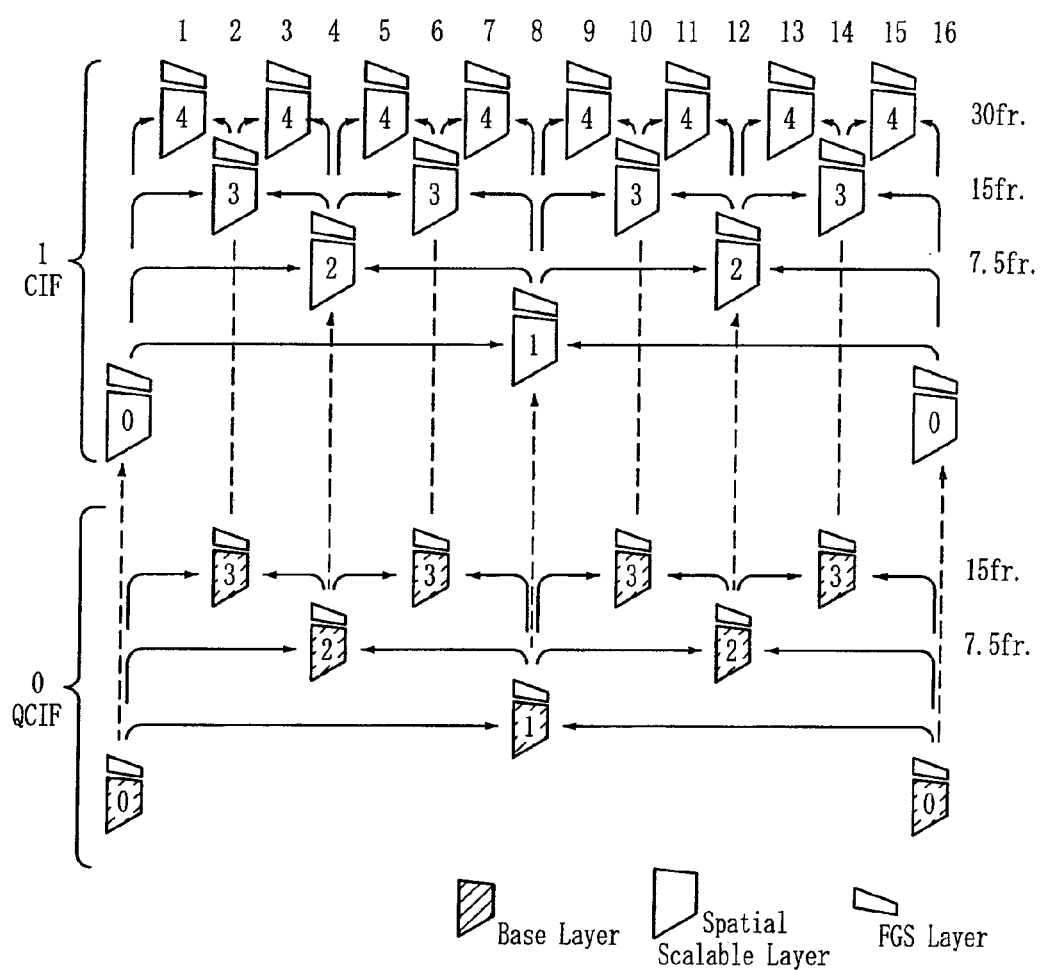
FIG. 7 is an explanatory view showing a screen and hierarchical structure for combined scalability encoding of the SVC in accordance with the present invention.

FIG. 7 is a view showing an example of a screen and hierarchical structure for combined scalability encoding of the SVC in accordance with the present invention.

In FIG. 7, only an Instantaneous Decoding Refresh (IDR) screen, which is the start part of an SVC stream, and a first Group Of Picture (GOP) screen are shown. One GOP consists of 16 screens, and the other GOPs not shown in the drawing also has a structure where the GOP size is 16.

The screen resolution that can be supported by the base layer is QCIF, and the screen resolution that can be supported by the spatial scalable layers is CIF.

In order to display different resolutions in different spatial layers, the DID value in the (TL, DID, QL) field of FIG. 6 is used.

That is, in FIG. 7, the NAL unit with DID=0 means a screen with a resolution of QCIF, and the NAL unit with DID=1 represents a screen with a resolution of CIF.

A hierarchical B-picture approach is applied for provision of temporal scalability, and the TL value in the (TL, DID, QL) field is used in order to display a supportable frame rate.

In FIG. 7, the TL value is displayed in the middle part of each screen indicated in a rectangle. In case of transmitting only a key picture with TL=0, the frame rate can be supported up to 1.875 fps, and in case of transmitting it, including a B-picture with TL=1, the frame rate can be supported up to 3.75 fps.

In case of additionally transmitting a B-picture with TL=2, the frame rate can be supported up to 7.5 fps, and in case of additionally transmitting B-pictures with TL=3 and TL=4, the frame rate can be supported up to 15 fps and 30 fps, respectively.

In FIG. 7, as the maximum TL value in the base layer is 3, the frame rate can be supported up to 15 fps in QCIF standard, and as the maximum TL value in the spatial scalable layer is 4, the frame rate can be supported up to 30 fps in CIF standard.

If the screens at the same point of time belonging to the base layer and the spatial scalable layer have the same TL value, inter-layer prediction encoding is executed in the direction of an arrow indicated by dotted lines in the drawing. The resolution of the base layer screen of the QCIF standard where DID=0 is upsampled to be utilized for the prediction encoding of the scalable layer screen of the CIF standard where DID=1.

Meanwhile, in FIG. 7, since each screen generates one FGS layer for support of SNR scalability, the NAL units containing encoding information of each FGS layer are all set to QL=1.

Figure 8:
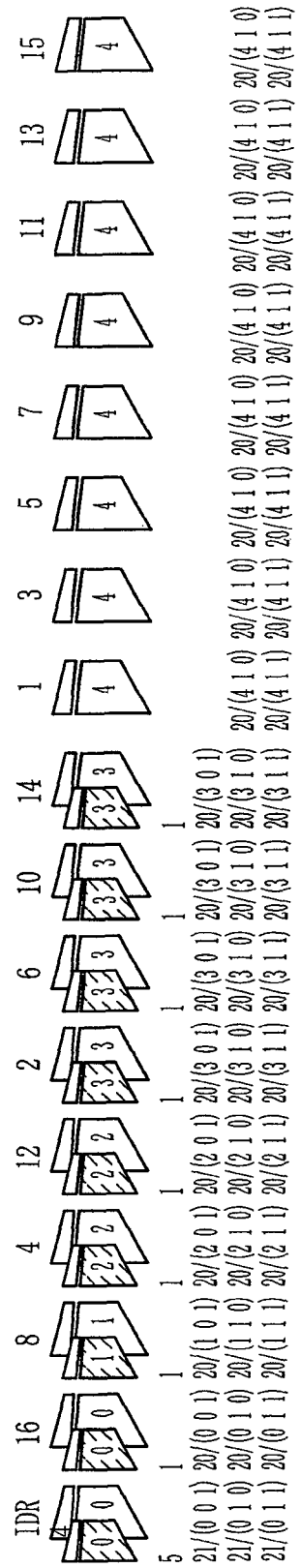
FIG. 8 is an explanatory view of the encoding order of SVC screens and of NAL units of the base layer and scalable layers belonging to each screen in accordance with the present invention.

FIG. 8 sequentially shows the encoding order of the screens and the NAL_unit_types and (TL, DID, QL) field information for NAL units of the base layer and scalable layers belonging to each screen in a case where SVC combined scalability encoding is applied to the screen and layer structure of FIG. 7.

Referring to the drawing, it can be seen that the encoding of an IDR picture occurs first. One base layer NAL unit having the header structure of FIG. 5 is generated in the base layer, and three scalable layer NAL units having the header structure of FIG. 6 are generated in the scalable layers.

The three NAL units generated in the scalable layers include one NAL unit for FGS scaling for the base layer, one NAL unit for the spatial scalable layer, and one NAL unit for FGS scaling for the spatial scalable layer.

The NAL unit firstly generated in the IDR picture is done in the base layer, and the header of the NAL unit conforms to the structure of (a) of FIG. 5. Because the base layer is an IDR picture, it can be seen from FIG. 9 that the "NAL_unit_type" of the header is set to "5" by FIG. 2 described above.

The NAL unit secondly generated in the IDR picture is the one for FGS scaling for the base layer. As the "NAL_unit_type" is set to "21" by FIG. 2, and QL is set to 1 (QL=1), (TL, DID, QL) becomes (0,0,1).

The NAL unit thirdly generated in the IDR picture is the one for spatial scalable layer. As the "NAL_unit_type" is set to "21" and DID is set to 1 (DID=1), (TL, DID, QL) becomes (0,1,0).

The NAL unit lastly generated in the IDR picture is the one for FGS scaling for spatial scalable layer. As the "NAL_unit_type" is set to "21" and QL is set to 1 (QL=1), (TL, DID, QL) becomes (0,1,1).

When the encoding of the IDR picture is finished as above, a screen with screen number 16, which is an I- or P-picture, is encoded. Because this picture is a non-IDR picture, "NAL_unit_type" is set to "1" in the base layer and to "20" in the scalable layer.

After completion of the encoding of the screen number 16, a screen with screen number 8 is encoded. The TL values for four NAL units generated at this time are all set to "1", thereby making it possible to support the frame rate of 3.75 fps.

Next, as the screens with screen numbers 4 and 12 are set to TL=2, the frame rate of 7.5 fps can be supported.

The screen numbers 2, 6, 10, and 14 are set to TL=3 with respect to all the four NAL units generated for support of the frame rate of 15 fps.

Meanwhile, the screen numbers 1, 3, 5, 7, 13, and 15 are encoded in the spatial scalable layer in order to support 30 fps only by the CIF standard.

As shown in FIG. 8, there exists no NAL unit belonging to the base layer, but only two NAL units belonging to the scalable layers exist.

To support 30 fps, TL is set to 4 (TL=4) and all the NAL units belong to the spatial scalable layer, and thus, they are commonly set to DID=1.

The NAL units for the spatial scalable layer are set to QL=0, and the NAL units for FGS scaling for the spatial scalable layer are set to QL=1.

As shown in FIG. 8, for the combined scalability of the SVC, analyzing the "NAL_unit_types" and (TL, DID, QL) field of the NAL units can detect the type of encoding information contained in the NAL units through the "NAL_unit_type" values and derive the temporal and spatial hierarchy between the NAL units through the (TL, DID, QL) values.

Such information can be very usefully utilized in effectively designing the RTP packetization scheme for cutting an SVC stream to a proper size and loading the same in an RTP packet.

In the non-interleaved mode, three packet types such as SNU, FU-A, and STAP-A are supported, as shown in FIG. 1.

Generally, the NAL units belonging to the base layer have a higher priority order in transmission than the NAL units belonging to the scalable layers, and are processed to be strong against an error through channel encoding, separately from scalable layer information. Therefore, the NAL units of the base layer are not loaded in an RTP packet by mixing with the NAL units of the scalable layers, but loaded independently in an RTP packet.

Accordingly, the STAP-A packet type that can be aggregated with the NAL units of the scalable layers is not applied to the NAL units of the base layer, but either SNU or FU-A is selected and loaded in an RTP packet by considering the length of the NAL units.

Applied to the NAL units belonging to the scalable layers are all the three packet types including SNU, FU-A, and STAP-A.

Among them, SNU and FU-A are selectively applied depending on the length of the NAL units, and STAP-A is applied in such a manner that several NAL units of the scalable layers belonging to the same screen number are aggregated as one within the range that does not exceed the MTU size and loaded in an RTP packet.

Hereinafter, an algorithm based on a look-ahead scheme for identifying scalable layer NAL units, to which the STAP-A type is to be applied, will be described.

(TL, DID, QL) information of $NU_i$, which is the NAL unit being inputted to the loop of the present algorithm, is indicated by $(T_i, D_i, Q_i)$, and the next NAL unit to be analyzed one step in advance by the look-ahead scheme is designated by $NU_{i+1}$, and (TL, DID, QL) information of $NU_{i+1}$ is indicated by $(T_{i+1}, D_{i+1}, Q_{i+1})$.

In order to determine whether to apply the STAP-A type, $(T_{i+1}, D_{i+1}, Q_{i+1})$ information of NU is extracted in advance and compared. The sequential condition that should be satisfied in order to aggregate NU and NU and add the same to one RTP payload is as follows:

i. $NU_{i+1}$ should not be the NAL unit belonging to the base layer.

ii. $NU_{i+1}$ should have the same TL value as $NU_i$.

iii. The sum of the size of the NAL units accumulated until $NU_i$ in an RTP payload plus the size of $NU_{i+1}$ should be smaller than the size of an MTU (in case of the internet, the general size of the MTU is 1500 bytes). In case of transmitting an RTP packet greater than the MTU, the RTP packet is fragmented into several packets by the fragmentation function of a router or gateway during transmission through a network, thereby causing a burden to the network and the client.

iv. The following conditions should be satisfied depending on the magnitude correlation of $Q_i$ and $Q_{i+1}$.

(a) If $Q_{i+1} > Q_i$, this means that the quality level of a FGS layer increases. This phenomenon occurs only to the NAL units belonging to the same screen number, and thus, the condition of STAP-A is satisfied. Therefore, $NU_{i+1}$ and $NU_i$ can be loaded together in an RTP payload.

(b) If $Q_{i+1} = Q_i$, this means that the quality level of a FGS layer does not increase. The situation where this phenomenon occurs can be divided into the situation of $D_{i+1} > D_i$ and vice versa. The situation of $D_{i+1} > D_i$ occurs only to the NAL units that always exist within the same screen number, and thus, $NU_i$ and $NU_{i+1}$ can be targets of ST AP-A. However, the situation of $D_{i+1} = D_i$ occurs between the NAL units having different screen numbers, i.e., different presentation time instants, and thus $NU_{i+1}$ and $NU_i$ cannot be targets of STAP-A.

In conclusion, in order to perform RTP packetization in the STAP-A type, $NU_i$ and $NU_{i+1}$ should sequentially satisfy all of i, ii, iii, and iv-(a) among the above conditions, or should sequentially satisfy all of i, ii, iii, and iv-(b).

Figure 9:
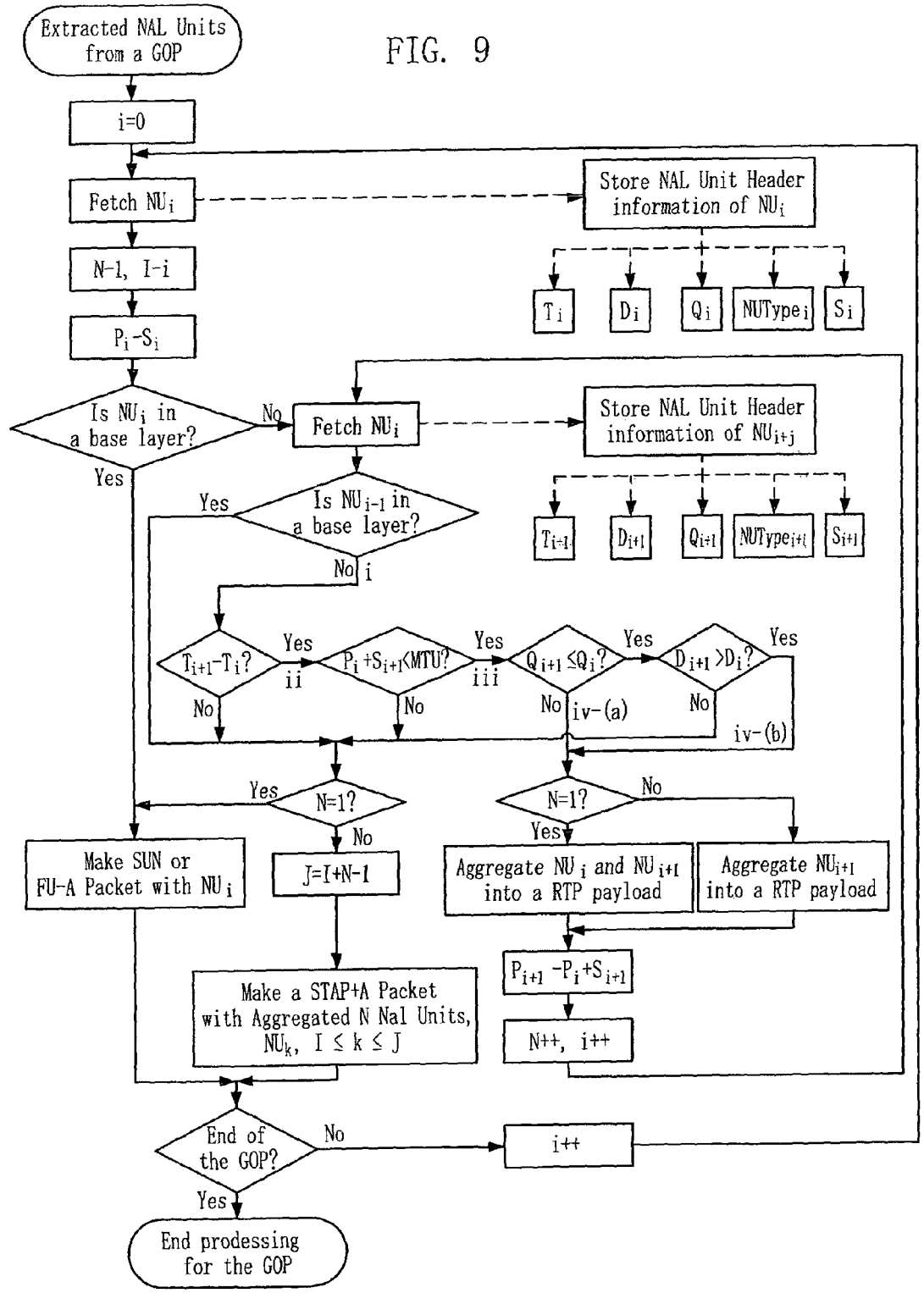
FIG. 9 is a detailed flow chart illustrating an RTP packetizing method in accordance with a preferred embodiment of the present invention.

There is shown in FIG. 9 a flowchart of the algorithm proposed in order to perform RTP packetization by determining the SNU, FU-A, and STAP-A packet types based on the above conditions for determining the packet type as STAP-A.

The flowchart as shown in FIG. 9 is performed for every GOP unit, and the RTP packet type is determined based on NUTypei, which is the "NAL_unit_type" of all the NAL units existing within one GOP, and $(T_i, D_i, Q_i)$, which is (TL, DID, QL) information, as explained in FIG. 8.

iv-(a), and iv-(b), which are the conditions for determining the packet type as STAP-A, are indicated on the corresponding blocks of FIG. 9, respectively.

In FIG. 9, N implies that a packetizing process that is currently in progress is in the process of loading an N-th NAL unit in an RTP payload. The algorithm shown in the drawing is operated in the look-ahead scheme of investigating $NU_{i+1}$ in advance in order to compare the STAP-A type condition. Therefore, if the packet type is determined as STAP-A when N=1, $NU_i$ and $NU_{i+1}$ are simultaneously loaded in the RTP payload, while if the packet type is determined as STAP-A when N>1, only $NU_{i+1}$ is loaded in the RTP payload.

If the packet type is not determined as STAP-A when N=1, the packet type is determined as SNU or FU-A by checking whether the size of $NU_i$ exceeds that of the MTU. On the other hand, if the packet type is not determined as STAP-A when N>1, an N-number of NAL units accumulated in an RTP payload up to present are loaded and transmitted in one RTP packet, and then parameters N and I are updated to generate a new RTP packet, followed by repeating the entire process.

Herein, parameters I and J are used so as to indicate the start position and end position of the N-number of NAL units to be loaded in the RTP payload. Meanwhile, Si means the size of $NU_i$, and Pi means the size of total packets accumulated in the RTP payload including $NU_i$ and is used to check whether or not the size of the total packets accumulated in the RTP payload exceeds that of the MTU.

Figure 10:
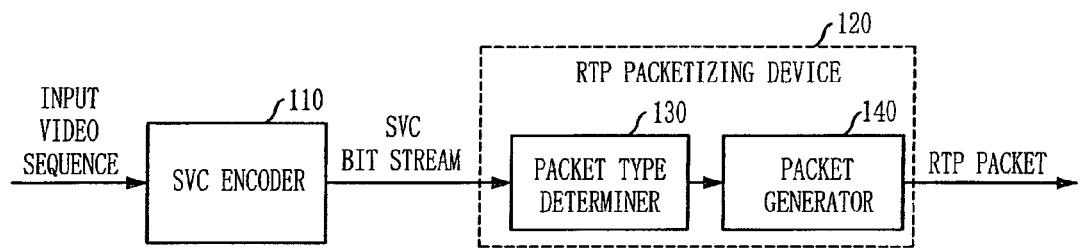
FIG. 10 is a block diagram illustrating the structure of an RTP packetizing apparatus for an SVC bitstream in accordance with another preferred embodiment of the present invention.

FIG. 10 is a block diagram illustrating an RTP packetizing apparatus for an SVC bitstream in accordance with another preferred embodiment of the present invention.

Referring to FIG. 10, the inventive RTP packetizing apparatus 120 for an SVC bitstream 120 includes a packet type determiner 130 for determining a packet type for an input SVC bitstream and a packet generator 140 for generating an RTP packet by fragmenting the SVC bitstream so as to correspond to the packet type determined by the packet type determiner 130 and loading the same in an RTP packet.

A description of the detailed functions of the components such as the packet type determiner 130 and the packet generator 140 will be substituted by the above description of FIGS. 5 to 9.

Reference numeral 110 not explained represents an SVC encoder 110 which provides the SVC bitstream to the packet type determiner 130 by encoding an input video sequence.

The method of the present invention as mentioned above may be implemented by a software program that is stored in a computer-readable storage medium such as CD-ROM, RAM, ROM, floppy disk, hard disk, optical magnetic disk, or the like. This procedure may be readily carried out by those skilled in the art; and therefore, details of thereof are omitted here.

The present application contains subject matter related to Korean Patent Application Nos. 2006-0110714 and 2006-0125144, filed in the Korean Intellectual Property Office on Nov. 9, 2006, and Dec. 8, 2006, the entire contents of which is incorporated herein by reference.

While the present invention has been described with respect to the specific embodiments, it will be apparent to those skilled in the art that various changes and modifications may be made without departing from the spirit and scope of the invention as defined in the following claims.

The invention claimed is:

1. A method for determining a packet type for a Scalable Video Coded (SVC) video bitstream, comprising the steps of:
   a) deriving temporal and spatial hierarchy information of Network Abstraction Layer (NAL) units from field information defined in the NAL unit headers of scalable layers;
   b) detecting the type of encoding information by applying combined scalability encoding to the hierarchical structure of the Scalable Video Coding (SVC);
   c) determining a Real-time Transport Protocol (RTP) packet type for the corresponding SVC video bitstream by using the derived temporal and spatial hierarchy information of the NAL units and the detected type of encoding information; and
   d) determining an encoding order for screens in the SVC video bitstream based on field information in the NAL unit headers, and wherein Single-Time Aggregation Packet-A (STAP-A) packet types are applied to several NAL units of scalable layers that are aggregated as one within a range that does not exceed a maximum transmission unit (MTU) size.

2. The method of claim 1, wherein the step a) is performed by a combination of related hierarchy values (TL (temporal level), DID (dependency identification), and QL (quality level)) of the layers in the temporal and spatial SNR (signal-to-noise ratio) scalability defined in the last octet of the scalable layer NAL unit headers.

3. The method of claim 1, wherein the step b) is carried out by analyzing "NAL_unit_type" values of the NAL units belonging to the base layer and the scalable layers, which are the "NAL_unit_type" values indicating encoding information.

4. The method of claim 1, wherein the packet type determined in the step c) is any one among Single NAL Unit (SNU), Fragmentation Unit-A (FU-A), and Single-Time Aggregation Packet-A (STAP-A) types of a non-interleaved mode.

5. The method of claim 1 wherein all NAL units of a base layer are not loaded in an RTP packet by mixing with NAL units of scalable layers, but loaded independently.

6. A Real-time Transport Protocol (RTP) packetizing method for a Scalable Video Coding (SVC) video bitstream, comprising the steps of:
   a) determining a packet type for the SVC video bitstream; and
   b) fragmenting the SVC video bitstream so as to conform the SVC video bitstream to the determined packet type and loading the fragments in RTP packets, wherein step a) includes:
      a1) deriving temporal and spatial hierarchy information of Network Abstraction Layer (NAL) units from field information defined in NAL unit headers of scalable layers;
      a2) detecting a type of encoding information by applying combined scalability encoding to the hierarchical structure of the SVC;
      a3) determining an RTP packet type for the SVC video bitstream by using the derived temporal and spatial hierarchy information of the NAL units and the detected type of encoding information; and
      a4) determining an encoding order for screens in the SVC video bitstream based on field information in the NAL unit headers, and wherein Single-Time Aggregation Packet-A (STAP-A) packet types are applied to several NAL units of scalable layers that are aggregated as one within a range that does not exceed a maximum transmission unit (MTU) size.

7. The method of claim 6, wherein the step a1) is performed by a combination of related hierarchy values temporal level (TL), dependency identification (DID), and quality level (QL) of the layers in the temporal and spatial signal-to-noise ratio (SNR) scalability defined in the last octet of the scalable layer NAL unit headers.

8. The method of claim 6, wherein the step a2) is performed by analyzing "NAL_unit_type" values of the NAL units belonging to the base layer and the scalable layers, which are the "NAL_unit_type" values indicating encoding information.

9. The method of claim 6, wherein the packet type determined in the step a3) is any one among Single NAL Unit (SNU), Fragmentation Unit-A (FU-A), and Single-Time Aggregation Packet-A (STAP-A) types of a non-interleaved mode.

10. An apparatus for packetizing a Scalable Video Coding (SVC) video bitstream, comprising:
   a computer system comprising a processor and a memory
   a packet type determiner operating on the computer system and configured to determine a packet type for the SVC video bitstream, determine an encoding order for screens in the SVC video bitstream based on field information in Network Abstraction Layer (NAL) unit headers, and apply Single-Time Aggregation Packet-A (STAP-A) packet types to several NAL units of scalable layers that are aggregated as one within a range that does not exceed a maximum transmission unit (MTU) size; and
   a packet generator operating on the computer system and configured to generate a packet by fragmenting the SVC video bitstream so as to conform the SVC video bitstream to the packet type determined by the packet type determiner and load the fragments in Real-time Transport Protocol (RTP) packets, wherein the packet type determiner is further configured to derive temporal and spatial hierarchy information of Network Abstraction Layer (NAL) units from field information defined in NAL unit headers of scalable layers, determine an RTP packet type for the SVC video bitstream by using the derived temporal and spatial hierarchy information of the NAL units, and detect a type of encoding information by applying combined scalability encoding to the hierarchical structure of the SVC.

* * * * *